(12) United States Patent
Zhao et al.

(10) Patent No.: US 12,003,450 B2
(45) Date of Patent: *Jun. 4, 2024

(54) SIGNAL TRANSMISSION METHOD AND DEVICE AND TERMINAL

(71) Applicant: GUANGDONG OPPO MOBILE TELECOMMUNICATIONS CORP., LTD., Dongguan (CN)

(72) Inventors: Zhenshan Zhao, Dongguan (CN); Qianxi Lu, Dongguan (CN); Huei-Ming Lin, Victoria (AU)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/949,982

(22) Filed: Sep. 21, 2022

(65) Prior Publication Data

US 2023/0019965 A1    Jan. 19, 2023

Related U.S. Application Data

(63) Continuation of application No. 17/207,466, filed on Mar. 19, 2021, now Pat. No. 11,483,116, which is a
(Continued)

(51) Int. Cl.
*H04W 4/02* (2018.01)
*H04L 5/00* (2006.01)
(Continued)

(52) U.S. Cl.
CPC .......... *H04L 5/0048* (2013.01); *H04W 4/023* (2013.01); *H04W 4/40* (2018.02); *H04W 56/001* (2013.01)

(58) Field of Classification Search
CPC ...... H04L 5/0048; H04L 5/0094; H04W 4/02; H04W 4/023; H04W 4/40; H04W 56/001; H04W 56/0015; H04W 68/00
See application file for complete search history.

(56) References Cited

U.S. PATENT DOCUMENTS 11,483,116 B2 * 10/2022 Zhao ................ H04W 4/023
2015/0358997 A1   12/2015 Yang et al.
(Continued)

FOREIGN PATENT DOCUMENTS

| CN | 101772157 A | 7/2010 |
| CN | 102265687 A | 11/2011 |

(Continued)

OTHER PUBLICATIONS

Guangdong OPPO Mobile Telecommunications Corp., Ltd., International Search Report and Written Opinion, PCT/CN2018/106656, dated May 31, 2019, 16 pgs.
(Continued)

*Primary Examiner* — Siu M Lee
(74) *Attorney, Agent, or Firm* — Morgan, Lewis & Bockius LLP

(57) ABSTRACT

Embodiments of the application provide a signal transmission method and device and a terminal performing the signal transmission method. The method comprises: a first terminal determining a first time point, and the first terminal sending a first signal at the first time point, the first signal being a positioning reference signal, thereby assisting other terminals in positioning, and improving the positioning accuracy between the terminals.

19 Claims, 3 Drawing Sheets

Related U.S. Application Data continuation of application No. PCT/CN2018/106656, filed on Sep. 20, 2018.

(51) Int. Cl.
*H04W 4/40* (2018.01)
*H04W 56/00* (2009.01)

(56) References Cited

U.S. PATENT DOCUMENTS

| | | | | |
|---|---|---|---|---|
| 2016/0095092 | A1* | 3/2016 | Khoryaev | G01S 5/0289 |
| | | | | 370/329 |
| 2016/0219541 | A1* | 7/2016 | Chatterjee | H04W 56/001 |
| 2017/0142682 | A1* | 5/2017 | Gunnarsson | H04W 72/51 |
| 2018/0049142 | A1 | 2/2018 | Yang et al. | |
| 2019/0239181 | A1* | 8/2019 | Gangakhedkar | H04W 64/00 |
| 2019/0245663 | A1 | 8/2019 | Kim et al. | |
| 2020/0014487 | A1* | 1/2020 | Akkarakaran | H04L 1/0013 |
| 2020/0359367 | A1* | 11/2020 | Tang | H04W 72/20 |
| 2021/0072340 | A1* | 3/2021 | Wang | H04L 5/0051 |
| 2021/0160810 | A1* | 5/2021 | Zhang | G01S 5/10 |
| 2021/0297215 | A1* | 9/2021 | Da | H04W 72/0446 |
| 2021/0307045 | A1 | 9/2021 | Ma et al. | |

FOREIGN PATENT DOCUMENTS

| | | |
|---|---|---|
| CN | 107852582 A | 3/2018 |
| WO | WO2018068817 A1 | 4/2018 |
| WO | WO2018068817 A1 | 4/2018 |
| WO | WO2020056660 A1 | 3/2020 |

OTHER PUBLICATIONS

Guangdong OPPO Mobile Telecommunications Corp., Ltd., Extended European Search Report, EP18933998.9, dated Sep. 6, 2021, 11 pgs.
Zhao, Office Action, U.S. Appl. No. 17/207,466, dated Mar. 16, 2022, 17 pgs.
Zhao, Notice of Allowance, U.S. Appl. No. 17/207,466, dated Jun. 27, 2022, 10 pgs.
Guangdong OPPO Mobile Telecommunications Corp., Ltd., EP18933998.9, First Office Action, dated Feb. 15, 2023, 8 pgs.

\* cited by examiner

Mode 3

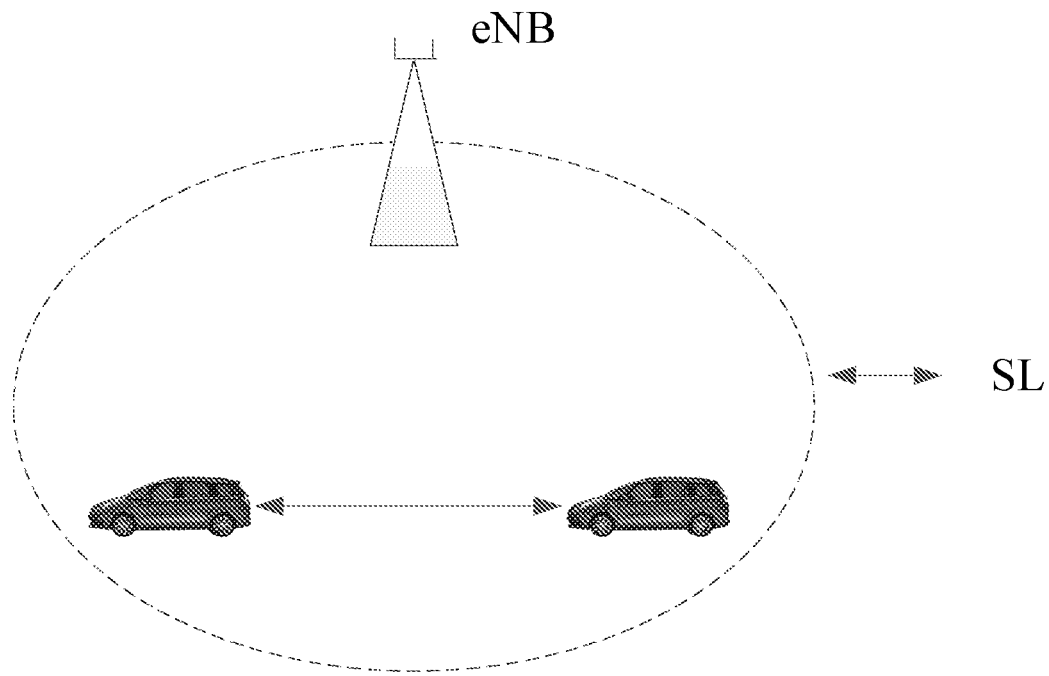
FIG. 3
A first terminal determines a first moment, and the first terminal sends a first signal at the first moment, wherein the first signal is a positioning reference signal
401
FIG. 4
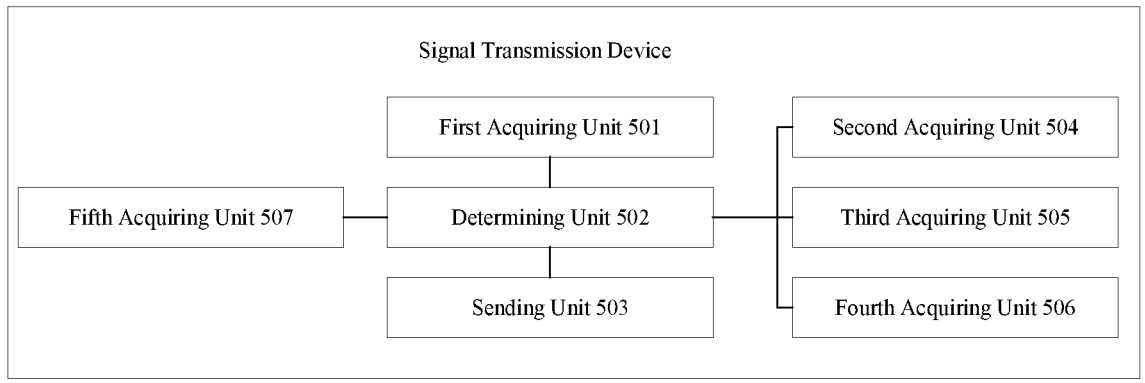
FIG. 5

SIGNAL TRANSMISSION METHOD AND DEVICE AND TERMINAL

CROSS-REFERENCE TO RELATED APPLICATION

This application is a continuation application of U.S. application Ser. No. 17/207,466, entitled "SIGNAL TRANSMISSION METHOD AND DEVICE AND TERMINAL", filed on Mar. 19, 2021, which is a continuation application of PCT Application No. PCT/CN2018/106656, entitled "SIGNAL TRANSMISSION METHOD AND DEVICE AND TERMINAL" filed Sep. 20, 2018, all of which are incorporated herein by reference in their entirety.

TECHNICAL FIELD

Embodiments of the application relate to the field of mobile communication technologies, and in particular, to a signal transmission method and device, and a terminal.

BACKGROUND

The vehicle-to-everything (V2X) system is based on device-to-device (D2D) sidelink (SL) transmission technology. Compared to traditional long term evolution (LTE) system in which the communication data is received or sent through the base station, the V2X system adopts a manner of direct terminal-to-terminal communication, thereby having higher spectrum efficiency and lower transmission delay.

In the third generation partner project (3GPP) release 14 (Rel-14), the V2X technology was standardized, and two transmission modes were defined: mode 3 and mode 4. In mode 3, the transmission resources of the terminal are allocated by the base station. In mode 4, the terminal determines the transmission resources in a manner of sensing and reservation.

In the new radio vehicle-to-everything (NR-V2X), it is necessary to support autonomous driving, so higher requirements are placed on data interaction between vehicles, such as higher throughput, lower time delay, higher reliability, greater coverage, more flexible resource allocation, and higher positioning accuracy. In NR-V2X, the requirement for vehicle positioning accuracy is that the positioning error is less than 1 meter. In order to improve the positioning accuracy, a vehicle may send positioning reference signal to assist another vehicle in positioning. How to send the positioning reference signals is a problem that needs to be solved.

SUMMARY

Embodiments of the application provide a signal transmission method and device, and a terminal.

The signal transmission method according to the embodiments of the application includes:
  determining, by a first terminal, a first time point; and
    sending, by the first terminal, first signal at the first time point, wherein the first signal is positioning reference signal.

The signal transmission device according to the embodiments of the application includes:
  a determining unit, configured to determine a first time point; and
  a sending unit, configured to send first signal at the first time point, wherein the first signal is positioning reference signal.

The terminal according to the embodiments of the application includes: a processor and a memory, wherein the memory is configured to store a computer program; the processor is configured to call and run the computer program stored in the memory, thereby implementing the signal transmission method as described above.

The chip according to the embodiments of the application is configured to implement the signal transmission method as described above.

Specifically, the chip includes: a processor, configured to call and run a computer program from a memory, thereby causing a device installed with the chip to implement the signal transmission method as described above.

A non-transitory computer-readable storage medium according to the embodiments of the application is used for storing a computer program, wherein the computer program causes a computer to implement the signal transmission method as described above.

A computer program product according to the embodiments of the application includes computer program instructions that cause a computer to implement the signal transmission method as described above.

A computer program according to the embodiments of the application causes, when being executed on a computer, the computer to implement the signal transmission method as described above.

According to the above technical solution, it can be clearly determined when the terminal sends the positioning reference signal, thereby assisting other terminals in positioning, and improving the positioning accuracy between the terminals.

BRIEF DESCRIPTION OF THE DRAWINGS

The drawings described here are used for providing a further understanding of the application and constitute a part thereof. The schematic embodiments of the application and the description thereof are used for explaining the application, rather than constituting an improper limitation on the application. In the drawings.

FIG. 3 is a schematic diagram illustrating the mode 4 of V2X;

FIG. 4 is a schematic flowchart of a signal transmission method according to an embodiment of the application;

FIG. 5 is a block diagram of a signal transmission device according to an embodiment of the application;

DETAILED DESCRIPTION

The technical solution according to the embodiments of the application will be described below with reference to the drawings in some embodiments of the application. Obviously, the described embodiments are part of the embodiments of the application, but not all of the embodiments. Based on the embodiments in the application, all other embodiments acquired by a person of ordinary skill in the art without creative efforts shall fall within the protection scope of the application.

The embodiments of the application can be applied to various communication systems, for example, Global System of Mobile (GSM) communication system, Code Division Multiple Access (CDMA) system, Wideband Code Division Multiple Access (WCDMA) system, General Packet Radio Service (GPRS), Long Term Evolution (LTE) system, LTE Frequency Division Duplex (FDD) system, LTE Time Division Duplex (TDD) system, Universal Mobile Telecommunication System (UMTS), Worldwide Interoperability for Microwave Access (WiMAX) communication system, 5G system and the like.

Figure 1:
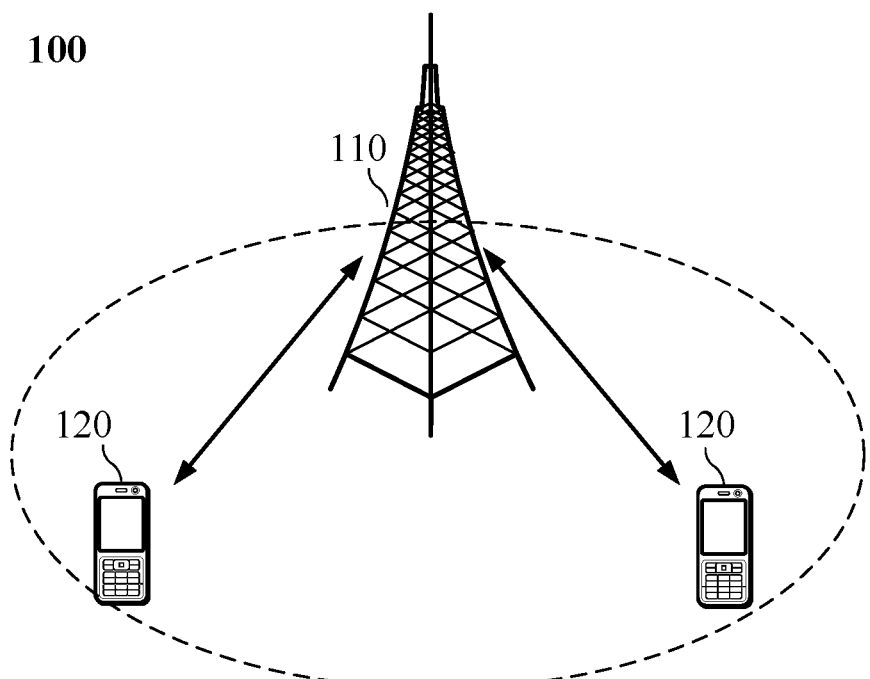
FIG. 1 is a schematic diagram of a communication system architecture according to an embodiment of the application.

For example, a communication system 100 according to an embodiment of the application is shown in FIG. 1. The communication system 100 may include a network device 110, and the network device 110 may be a device that communicates with a terminal device 120 (or a communication terminal or a terminal). The network device 110 may provide communication coverage for a specific geographic area, and may communicate with terminal devices located within the coverage area. In some embodiments, the network device 110 may be a base transceiver station (BTS) in the GSM system or CDMA system, or a NodeB (NB) in the WCDMA system, or an evolutional Node B (eNB or eNodeB) in the LTE system, or a gNB in the NR system, or a wireless controller in the Cloud Radio Access Network (CRAN). Alternatively, the network device may be a mobile switching center, relay station, access point, vehicle equipment, wearable devices, hubs, switches, bridges, routers, network-side devices in NR networks, or network devices in future-evolved public land mobile networks (PLMN).

The communication system 100 further includes at least one terminal 120 located within the coverage area of the network device 110. A connection to the "terminal" used herein includes, but is not limited to, connection via wired lines, such as public switched telephone networks (PSTN), digital subscriber lines (DSL), digital cables, direct cable connections; and/or another data connection/network; and/or connection via a wireless interface, such as cellular networks, wireless local area networks (WLAN), digital television networks such as DVB-H networks, satellite networks, AM-FM broadcast transmitter; and/or another terminal device configured to receive/transmit communication signals; and/or an Internet of Things (IoT) device. A terminal device configured to communicate through the wireless interface may be referred to as a "wireless communication terminal", a "wireless terminal", or a "mobile terminal". Examples of mobile terminals include, but are not limited to, satellite or cellular phones; personal communication system (PCS) terminals that can combine cellular radiotelephones, data processing, facsimile, and data communications capabilities; PDA that can combine radiotelephones, pagers, Internet/Intranet access, Web browser, notepad, calendar, and/or Global Positioning System (GPS) receiver; and conventional laptop and/or palm-type receivers or other electronic devices including radiotelephone transceivers. The terminal device may refer to an access terminal, user equipment (UE), user unit, user station, mobile station, mobile site, remote station, remote terminal, mobile device, user terminal, terminal, wireless communication device, user agent, or user device. The access terminal can be a cellular phone, a cordless phone, a Session Initiation Protocol (SIP) phone, a Wireless Local Loop (WLL) station, a Personal Digital Processing (PDA), handheld devices with wireless communication function, computing devices, or other processing devices connected to a wireless modem, in-vehicle devices, wearable devices, terminal devices in the 5G network, terminal devices in a future evolved PLMN, and the like.

In some embodiments, D2D (Device to Device) communication can be performed between terminal devices 120.

In some embodiments, the 5G system or 5G network may also be referred to as new radio (NR) system or NR network.

FIG. 1 exemplarily illustrates one network device and two terminal devices. In some embodiments, the communication system 100 may include multiple network devices and the coverage of each network device may include other numbers of terminal devices. The embodiments are not limited thereto.

In some embodiments, the communication system 100 may further include other network entities such as a network controller, a mobility management entity, and the like, the embodiments of the application are not limited thereto.

It should be understood that the device having a communication function in the network/system in some embodiments of the application may be referred to as a communication device. Taking the communication system 100 shown in FIG. 1 as an example, the communication device may include a network device 110 and a terminal device 120 having a communication function. The network device 110 and the terminal device 120 may be specific devices described above, and are not repeated herein. The communication device may also include other devices in the communication system 100, for example, other network entities such as a network controller, a mobile management entity, and the like, which is not limited in some embodiments of the application.

It should be understood that the terms "system" and "network" are often used interchangeably herein. The term "and/or" in this document is only a kind of association relationship describing related objects, which means that there can be three kinds of relationships, for example, A and/or B may refer to three cases: A exists alone, A and B exist simultaneously, or B exists alone. In addition, the character "/" in this article generally indicates that the related objects are in an "or" relationship.

In order to facilitate understanding of the technical solutions according to the embodiments of the application, mode 3 and mode 4 in the IoV are explained below.

Figure 2:
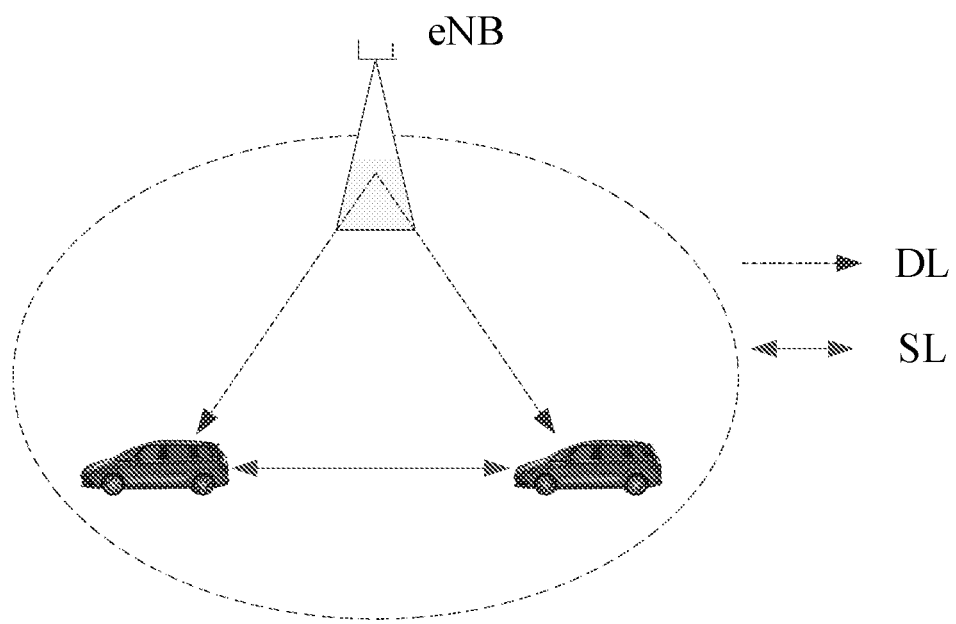
FIG. 2 is a schematic diagram illustrating the mode 3 of V2X.

Mode 3 is as shown in FIG. 2, in which sidelink transmission resources of an in-vehicle terminal are allocated by a base station (e.g., an evolved NodeB (eNB) in LTE). Specifically, the base station transmits a control message used for indicating the grant resource to the in-vehicle terminal via down link (DL). Then, the in-vehicle terminal performs data transmission via SL according to the resource allocated by the base station. In mode 3, the base station may allocate resources for a single transmission to the in-vehicle terminal, and may also allocate resources for the terminal to semi-static transmission.

Mode 4 is as shown in FIG. 3, in which an in-vehicle terminal acquires transmission resources of the sidelink through a transmission mode of sensing and reservation. The in-vehicle terminal acquires an available transmission resource set by sensing in a resource pool, and randomly selects a resource from the transmission resource set for sidelink data transmission. Because the services in the IoV system have periodic characteristics, in-vehicle terminals may typically adopt a semi-static transmission manner. In other words, after the in-vehicle terminal selects a transmission resource, it will continuously use the resource in multiple transmission cycles, thereby reducing resource reselection and the probability of resource conflicts. The in-vehicle terminal will carry the information for reserving the next transmission resource in the control information of current transmission, so that other terminals can determine whether this resource is reserved and used by the in-vehicle terminal by detecting the control information of the in-vehicle terminal, thereby reducing resource conflict.

It should be noted that in LTE-V2X, mode 3 is used for indicating that the transmission resources of the in-vehicle terminal are allocated by the base station, and mode 4 is used for indicating that the transmission resources of the in-vehicle terminal are independently selected by the terminal. In NR-V2X, any new transmission mode may be defined without being limited in the application.

FIG. 4 is a schematic flowchart of a signal transmission method according to an embodiment of the application. As shown in FIG. 4, the signal transmission method includes the following steps.

In step 401, a first terminal determines a first time point, and the first terminal sends first signal at the first time point, where the first signal is positioning reference signal.

In some embodiments of the application, the first terminal may be any device capable of communicating with network, such as a mobile phone, a tablet computer, an in-vehicle terminal, a wearable device, and a notebook.

In some embodiments, the first terminal acquires synchronization information at a second time point; the first terminal determines the first time point within a first time range after the second time point. The manner for acquiring the synchronization information may be as follows.

1) The synchronization information comes from synchronization signal of a Global Navigation Satellite System (GNSS); or,
2) the synchronization information comes from synchronization signal of a network device; or
3) the synchronization information comes from sidelink synchronization signal sent by a third terminal.

For the above manner 2), the network device may be a base station, for example, the first terminal receives primary synchronization signal (PSS) and/or secondary synchronization signal (SSS) sent by the base station.

For the above manner 3), the third terminal may be the same type as the first terminal, or may be different from the type of the first terminal. For example, the first terminal is a mobile phone and the third terminal is an in-vehicle terminal. For another example, both the first terminal and the second terminal are in-vehicle terminals. The first terminal and the second terminal can directly communicate with each other. Specifically, the first terminal receives sidelink synchronization signal (SLSS) sent by the third terminal through the sidelink.

In some embodiments of the application, the first terminal acquires synchronization information at the second time point. For example, the first terminal acquires synchronization information at a time point n. Here, the unit of the second time point may be an absolute time or a time domain time, such as subframe, time slot, time domain symbol, short time transmission interval (sTTI), and so on.

In some embodiments of the application, after the first terminal acquires the synchronization information at the second time point, the first terminal sends the first signal at the first time point, where the first time point is a time point within a first time range after the second time point. The unit of the first time point may be an absolute time or a time domain time, such as subframe, time slot, time domain symbol, sTTI, and the like. Here, a target to which the first terminal sends the first signal may be a terminal or a network device. For example, the first terminal sends positioning reference signal to other terminals through the sidelink. For another example, the first terminal sends positioning reference signal to the network device (such as a base station) through an uplink.

For example, the first terminal receives the synchronization signal sent by the network in subframe 0, selects subframe 4 in a subframe range [1,9] as the first time point, and sends the positioning reference signal in subframe 4 through the sidelink, where subframe 0 is the second time point, subframe range [1,9] is the first time range, and subframe 4 is the first time point.

In some embodiments of the application, the first terminal may determine the first time point in the following manner.

1) The first terminal acquires first indication information, and determines the first time point according to the first indication information.

Here, the first terminal acquires the first indication information according to pre-configured information.

Alternatively, the first terminal acquires the first indication information according to network configuration information.

Alternatively, the first terminal acquires the first indication information sent by a second terminal.

The network configuration information may be transmitted through radio resource control (RRC) signaling, broadcast information, control signaling, or the like.

Further, the first indication information may include one of the following information.

1.1) The first indication information is used for indicating time index information; and the first terminal determines a time point corresponding to the time index information as the first time point.

In some embodiments, the first indication information is used for indicating the time index information, and the first terminal may acquire the time index information according to pre-configured information or network configuration information, or acquire the time index information from the second terminal, and determine the time point corresponding to the time index information as the first time point. In some embodiments, the first terminal does not need to acquire the synchronization information. In some embodiments, the first terminal does not need to determine the first time range.

For example, the first indication information includes time index information m. The first terminal may determine a time point corresponding to the time index information m in a correspondence between time indexes and time points, and determine the time point as the first time point for sending the first signal.

1.2) The first indication information is used for indicating time offset information, and the time offset information is indicative of a time offset between the first time point and the second time point. The first terminal determines the first time point based on the time offset information and the second time point. Alternatively, the time offset information is indicative of a time offset of the first time point with respect to a time unit; and the first terminal determines the first time point based on the time offset information and the time unit.

For example, the first indication information includes time offset information k=5. Then, after the first terminal acquires the synchronization information at the second time point, the first terminal sends the first signal at the fifth time unit after the second time point. Assuming that the first terminal acquires the synchronization information in time slot n, and then sends the first signal in time slot n+5.

For another example, the first indication information includes time offset information k=5, which is a time offset relative to subframe 0 in a radio frame. Therefore, the first terminal determines that the subframe 5 in each radio frame at is the first time point, and sends the first signal in this subframe.

2) The first terminal selects a time point within the first time range as the first time point.

2.1) The first terminal randomly selects a time point within the first time range as the first time point.

2.2) Alternatively, the first terminal selects, according to first identity information, a time point within the first time range as the first time point.

In some embodiments, the first identity information includes at least one of the following: a cell-radio network temporary identity (C-RNTI) of the first terminal, an intra-group identity of a group to which the first terminal belongs, or other identity information used for distinguishing the first terminal.

For example, the first terminal belongs to a communication group, which includes 10 terminals, and the identifiers of the 10 terminals in the group correspond to the indexes [0, 9], and the index corresponding to the first terminal is 4. The first time range includes 10 subframes, and the first terminal may determine the first time point within the first time range according to the following manner:

$t=\text{mod}(ID,N)$

Herein, ID indicates the group identification of the first terminal within the group, that is, index 4; N indicates the total number of subframes in the first time range, that is, N=10; and t indicates the first time point at which the first terminal sends the first signal; and mod ( ) indicates the remainder operation.

3) The first terminal acquires configuration information of a resource pool, and determines the first time point according to the configuration information of the resource pool, wherein the first time point is a transmission time point in the resource pool.

For example, the configuration information of the resource pool includes four transmission resources, which are resource 1, resource 2, resource 3, and resource 4, where a time point corresponding to resource 1 is t1, a time point corresponding to resource 2 is t2, a time point corresponding to resource 3 is t3, and a time point corresponding to resource 4 is t4. After the first terminal acquires the synchronization information at time point n, the first terminal selects a first available time point from the resource pool that is located after time point n as the first time point for sending the first signal. The time point t2 corresponding to the resource 2 is the first available time after the time point n, so the first terminal sends the first signal at time point t2. In some embodiments, the first terminal determines a frequency domain resource range corresponding to time point t2 according to the configuration information of the resource pool, and the first signal occupies all frequency domain resources corresponding to the time point t2.

Specifically, the first terminal acquires configuration information of a resource pool. If the first time point determined by the first terminal according to first indication information or the first time point selected by the first terminal within the first time range (that is, the first time point determined through the foregoing manner 1) or manner 2)) is not in the resource pool, the first terminal determines a first available time point after the first time point and located within the resource pool as the first time point for sending the first signal.

For example, the configuration information of the resource pool includes four transmission resources, which are resource 1, resource 2, resource 3, and resource 4, where a time point corresponding to resource 1 is t1, a time point corresponding to resource 2 is t2, a time point corresponding to resource 3 is t3, and a time point corresponding to resource 4 is t4. According to the first indication information in the above manner 1), the first terminal determines a time point m (corresponding to the first time point) for sending the first signal. But if time point m is not present in the resource pool, the first terminal selects a first available time point after the time point m from the resource pool as the first time point for sending the first signal. If the time point t1 corresponding to the resource 1 is the first available time point after the time point m, the first terminal sends the first signal at time point t1. In some embodiments, the first terminal determines a frequency domain resource range corresponding to time point t1 according to the configuration information of the resource pool, and the first signal occupies all frequency domain resources corresponding to the time point t1.

4) The first terminal acquires second indication information, where the second indication information is used for determining a time domain position of a first reserved time point, and the first terminal determines the first reserved time point as the first time point for sending the first signal; wherein the reserved time point refers to a time point that is not used for transmitting sidelink data.

Here, the unit of the first reserved time point may be an absolute time or a time domain time, such as a subframe, a time slot, a time domain symbol, an sTTI, or the like.

The first terminal acquires the second indication information according to pre-configured information; or the first terminal acquires the second indication information according to network configuration information; or the first terminal receives the second indication information sent by a third terminal.

For example, the first terminal acquires the second indication information, and the second indication information indicates that the last subframe in each radio frame, that is, subframe 9, is the reserved subframe. Therefore, the first terminal determines the subframe 9 in each radio frame as the first time point, and sends the first signal at this subframe.

In some embodiments, the first reserved time point is a reserved time point within the first time range.

For example, the first terminal receives synchronization information at time point n, and the first time range includes time points [n+1, n+k]. It should be noted that the unit of k and the unit of n need to be consistent with each other, for example, both are time slots or subframes. The first reserved time point is time point n+3, n+3≤n+k, and time n+3 is not used for transmitting sidelink data, such as physical sidelink control channel (PSCCH), physical sidelink shared channel (PSSCH), or physical sidelink broadcast channel (PSBCH). Then the first terminal sends the first signal at point time n+3.

In some embodiments of the application, the first terminal acquires first information, and determines the first time range according to the first information. In some embodiments, the first information is used for determining positioning accuracy information. Specifically, the first information includes at least one of the following: positioning accuracy information, timing error information, frequency deviation information, quality of service (QoS) information, or QoS class identifier (QCI) information.

Here, the QoS information or QCI information is used for determining positioning accuracy information. Based on this, the first terminal can determine the positioning accuracy information according to the QoS information or QCI information.

For example, the first terminal acquires synchronization information at time point n, and determines the first time point for transmitting the first information within a first time range [n+1, n+k]. Here, the value of k is determined according to the positioning accuracy information. The larger the value of k, the lower the positioning accuracy. On the contrary, the smaller the value of k, the higher the positioning accuracy.

FIG. 5 is a block diagram of a signal transmission device according to an embodiment of the application. As shown in FIG. 5, the signal transmission device includes:
- a determining unit 502, configured to determine a first time point; and
- a sending unit 503, configured to send first signal at the first time point, wherein the first signal is positioning reference signal.

In some embodiments, the device further includes:
- a first acquiring unit 501, configured to acquire synchronization information at a second time point;
- wherein the determining unit 502 is configured to determine the first time point within a first time range after the second time point.

In some embodiments, the device further includes:
- a second acquiring unit 504, configured to acquire first indication information;
- wherein the determining unit 502 is configured to determine the first time point according to the first indication information.

In some embodiments, the first indication information is used for indicating time index information; and
the determining unit 502 is configured to determine a time point corresponding to the time index information as the first time point.

In some embodiments, the first indication information is used for indicating time offset information, the time offset information being indicative of a time offset between the first time point and the second time point; or the time offset information being indicative of a time offset between the first time point and a time unit.

The determining unit 502 is configured to determine the first time point based on the time offset information and the second time point; or determine the first time point based on the time offset information and the time unit.

In some embodiments, the second acquiring unit 504 is configured to acquire the first indication information according to pre-configured information; or acquire the first indication information according to network configuration information; or receive the first indication information sent by a second terminal.

In some embodiments, wherein the determining unit 502 is configured to select a time point within the first time range as the first time point.

In some embodiments, wherein the determining unit 502 is configured to select randomly a time point within the first time range as the first time point; or select, according to first identity information, a time point within the first time range as the first time point.

In some embodiments, the first identity information includes at least one of: a C-RNTI of the first terminal, or an intra-group identity of a group to which the first terminal belongs, or other identity information used for distinguishing the first terminal.

In some embodiments, the device further includes:
- a third acquiring unit 505, configured to acquire configuration information of a resource pool;
- wherein the determining unit 502 is configured to determine the first time point according to the configuration information of the resource pool, wherein the first time point is a transmission time point in the resource pool.

In some embodiments, the device further includes:
- a third acquiring unit 505, configured to acquire configuration information of a resource pool;
- wherein the determining unit 502 is configured to determine, when the first time point determined according to first indication information or the first time point selected within a first time range is not in the resource pool, a first available time point after the first time point and located within the resource pool as the first time point for sending the first signal.

In some embodiments, the device further includes:
- a fourth acquiring unit 506, configured to acquire second indication information, the second indication information being used for determining a time domain position of a first reserved time point;
- wherein the determining unit 502 is configured to determine the first reserved time point as the first time point for sending the first signal;
- wherein the reserved time point refers to a time point not used for transmitting sidelink data.

In some embodiments, the fourth acquiring unit 506 is configured to acquire the second indication information according to pre-configured information; or acquire the second indication information according to network configuration information; or receive the second indication information sent by a third terminal.

In some embodiments, the device further includes:
- a fifth acquiring unit 507, configured to acquire first information used for determining the first time range according to the first information.

In some embodiments, the first information includes at least one of: positioning accuracy information, timing error information, frequency deviation information, quality of service QoS information, or QoS class identifier QCI information.

In some embodiments, the synchronization information comes from synchronization signal of a GNSS; or
the synchronization information comes from synchronization signal of a network device; or
the synchronization information comes from sidelink synchronization signal sent by a third terminal.

Those skilled in the art should understand that the related description of the foregoing signal transmission device in the embodiments of the application can be understood with reference to the related description of the signal transmission method in the embodiments of the application.

Figure 6:
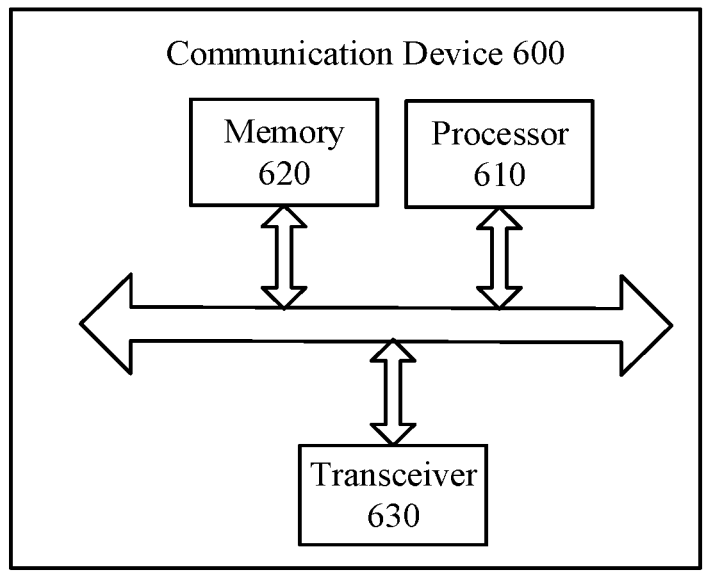
FIG. 6 is a block diagram of a communication device according to an embodiment of the application.

FIG. 6 is a block diagram illustrating a communication device 600 according to an embodiment of the application. The communication device may be a terminal. The communication device 600 shown in FIG. 6 includes a processor 610, which can call and run a computer program from a memory to implement the method in some embodiments of the application.

In some embodiments, as shown in FIG. 6, the communication device 600 may further include a memory 620. The processor 610 may call and run the computer program from the memory 620 to implement the method in some embodiments of the application.

The memory 620 may be a separate device independent of the processor 610, or may be integrated in the processor 610.

In some embodiments, as shown in FIG. 6, the communication device 600 may further include a transceiver 630, and the processor 610 may control the transceiver 630 to communicate with other devices. Specifically, it may send information or data to other devices, or receive other information, data sent by the device.

The transceiver 630 may include a transmitter and a receiver. The transceiver 630 may further include antennas, and the number of antennas may be one or more.

In some embodiments, the communication device 600 may be a network device according to an embodiment of the application, and the communication device 600 may implement a corresponding process implemented by the network device in each method according to the embodiments of the application, which will not be repeated here for the sake of brevity.

In some embodiments, the communication device 600 may be a mobile terminal/a terminal device according to an embodiment of the application, and the communication device 600 may implement a corresponding process implemented by the mobile terminal/the terminal device in each method according to the embodiments of the application, which will not be repeated here for the sake of brevity.

Figure 7:
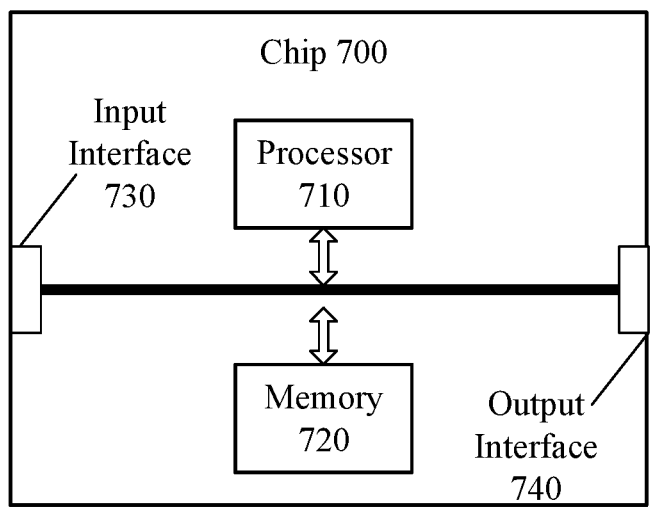
FIG. 7 is a block diagram of a chip according to an embodiment of the application.

FIG. 7 is a block diagram illustrating a chip according to an embodiment of the application. The chip 700 shown in FIG. 7 includes a processor 710, and the processor 710 can call and run a computer program from a memory to implement the method in some embodiments of the application.

In some embodiments, as shown in FIG. 7, the chip 700 may further include a memory 720. The processor 710 may call and run the computer program from the memory 720 to implement the method in some embodiments of the application.

The memory 720 may be a separate device independent of the processor 710, or may be integrated in the processor 710.

In some embodiments, the chip 700 may further include an input interface 730. The processor 710 may control the input interface 730 to communicate with other devices or chips. Specifically, the processor 710 may acquire information or data sent by other devices or chips.

In some embodiments, the chip 700 may further include an output interface 740. The processor 710 may control the output interface 740 to communicate with other devices or chips. Specifically, the processor 710 may output information or data to the other devices or chips.

In some embodiments, the chip can be applied to the network device according to the embodiments of the application, and the chip can implement the corresponding process implemented by the network device in the method according to the embodiments of the application. For brevity, details are not described herein.

In some embodiments, the chip can be applied to the mobile terminal/the terminal device according to the embodiments of the application, and the chip can implement the corresponding process implemented by the mobile terminal/the terminal device in the method according to the embodiments of the application. For brevity, details are not described herein.

It should be understood that the chip mentioned in some embodiments of the application may also be referred to as a system-level chip, a system chip, a chip system or a system-on-chip.

Figure 8:
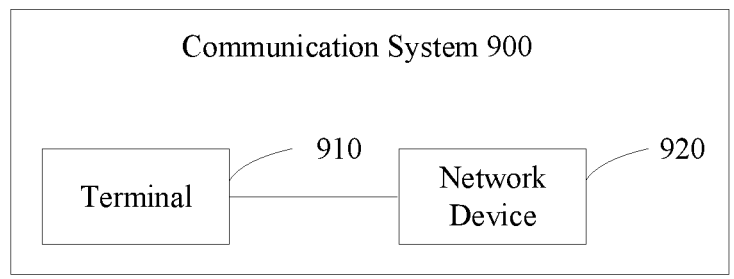
FIG. 8 is a block diagram of a communication system according to an embodiment of the application.

FIG. 8 is a block diagram illustrating a communication system 900 according to an embodiment of the application. As shown in FIG. 8, the communication system 900 includes a terminal device 910 and a network device 920.

The terminal device 910 may be configured to implement the corresponding functions implemented by the terminal device in the foregoing methods, and the network device 920 may be configured to implement the corresponding functions implemented by the network device in the foregoing methods. Detailed description will be not repeated here for brevity.

It should be understood that the processor in some embodiments of the application may be an integrated circuit chip and has a signal processing capability. In the implementation process, each step of the foregoing method embodiment may be completed by using an integrated logic circuit of hardware in a processor or an instruction in a form of software. The above-mentioned processor may be a general-purpose processor, a digital signal processor (DSP), an application specific integrated circuit (ASIC), a field programmable gate array (FPGA), or other programming logic devices, discrete gate or transistor logic devices, discrete hardware components, which can implement or execute various methods, steps, and logical block diagrams disclosed in some embodiments of the application. The general-purpose processor may be a microprocessor or the processor may be any conventional processor or the like. The steps of the method disclosed in combination with the embodiments of the application may be directly implemented by a hardware decoding processor, or may be performed by using a combination of hardware and software modules in the decoding processor. The software module may be located in a mature storage medium such as a random access memory, a flash memory, a read-only memory, a programmable read-only memory, or an electrically erasable programmable memory, a register, and the like. The storage medium is located in a memory, and the processor reads the information in the memory and completes the steps of the foregoing method in combination with its hardware.

It should be understood that the memory mentioned in some embodiments of the application may be a volatile memory or a non-volatile memory, or may include both volatile and non-volatile memory. In some embodiments, the non-volatile memory may be read-only memory (ROM), programmable read-only memory (PROM), erasable programmable read-only memory (erasable PROM, EPROM), electrical memory erasable programmable read-only memory (EPROM, EEPROM) or flash memory. The volatile memory may be a random access memory (RAM), which is used as an external cache. By way of example but not limitation, many forms of RAM are available, such as a static random access memory (static RAM, SRAM), a dynamic random access memory (dynamic RAM, DRAM), synchronous dynamic random access memory (SDRAM), double data rate synchronous dynamic random access memory (Double SDRAM, DDR SDRAM), enhanced synchronous dynamic random access memory (enhanced SDRAM, ESDRAM), synchronous connection Dynamic random access memory (synch link DRAM, SLDRAM), direct memory bus random access memory (Direct Rambus RAM, DR RAM) and so on. It should be noted that the memory of the systems and methods described herein is intended to include, but is not limited to, these and any other suitable types of memory.

It should be understood that the foregoing memory is exemplary but not restrictive. For example, the memory in the embodiments of the application may also be a static random access memory (static RAM, SRAM), a dynamic random access memory (dynamic RAM, DRAM), synchronous dynamic random access memory (synchronous DRAM, SDRAM), double data rate synchronous dynamic random access memory (double data rate SDRAM, DDR SDRAM), enhanced synchronous dynamic random access memory (enhanced SDRAM, ESDRAM), synch link dynamic random access memory (synch link DRAM, SLDRAM), and direct Rambus random access memory (direct Rambus RAM, DR RAM) and so on. That is, the memories in the embodiments of the application are intended to include, but not limited to, these and any other suitable types of memories.

A computer-readable storage medium is also provided in some embodiments of the application for storing a computer program.

In some embodiments, the computer-readable storage medium may be applied to the network device in some embodiments of the application, and the computer program causes the computer to execute the corresponding process implemented by the network device in each method in some embodiments of the application. For the sake of brevity, details will not be repeated here.

In some embodiments, the computer-readable storage medium may be applied to the mobile terminal/terminal device in some embodiments of the application, and the computer program causes the computer to execute a corresponding process implemented by the mobile terminal/terminal device in each method in some embodiments of the application.

For the sake of brevity, details will not be repeated here.

A computer program product is also provided in some embodiments of the application, including computer program instructions.

In some embodiments, the computer program product can be applied to the network device in some embodiments of the application, and the computer program instruction causes the computer to execute a corresponding process implemented by the network device in each method in some embodiments of the application. For the sake of brevity, details will not be repeated here.

In some embodiments, the computer program product can be applied to a mobile terminal/terminal device in some embodiments of the application, and the computer program instructions cause the computer to execute a corresponding process implemented by the mobile terminal/terminal device in each method in some embodiments of the application. For the sake of brevity, details will not be repeated here.

A computer program is also provided in some embodiments of the application.

In some embodiments, the computer program may be applied to a network device in some embodiments of the application. When the computer program is run on a computer, the computer is caused to execute a corresponding process implemented by the network device in each method in some embodiments of the application. For the sake of brevity, details will not be repeated here.

In some embodiments, the computer program may be applied to a mobile terminal/terminal device in some embodiments of the application. When the computer program is run on a computer, the computer is caused to execute a corresponding process implemented by the mobile terminal/terminal device in each method in some embodiments of the application. For the sake of brevity, details will not be repeated here.

Those of ordinary skill in the art may realize that the units and algorithm steps of each example described in connection with the embodiments disclosed herein can be implemented by electronic hardware, or a combination of computer software and electronic hardware. Whether these functions are performed in hardware or software depends on the specific application and design constraints of the technical solution. Those of ordinary skill in the art can use different methods to implement the described functions for each specific application, but such implementation should not be considered to be beyond the scope of this application.

Those skilled in the art can clearly understand that, for the convenience and brevity of description, the specific working processes of the systems, devices, and units described above can refer to the corresponding processes in the foregoing method embodiments, and are not repeated here.

In the several embodiments provided in this application, it should be understood that the disclosed systems, devices, and methods may be implemented in other ways. For example, the apparatus embodiments described above are only for exemplary. For example, the division of units in some embodiments described above is only a logical function division. In actual implementation, there may be another division manner. For example, multiple units or components may be combined or integrated to another system, or some features can be ignored or not implemented. In addition, the displayed or discussed mutual coupling or direct coupling or communication connection may be indirect coupling or communication connection through some interfaces, devices or units, which may be electrical, mechanical or in other forms.

The above-mentioned units described as separate components may be or may not be physically separated, that is, they may be located in one place, or may be distributed on multiple network units. Some or all of the units can be selected according to actual needs to achieve the objectives of the embodiments of the application.

In addition, each functional unit in each embodiment of the application may be integrated into one processing unit, or each of the units may exist separately physically, or two or more units may be integrated into one unit.

If the functions are implemented in the form of software functional units and sold or used as an independent product, they can be stored in a computer-readable storage medium. Based on this understanding, an essential part of the technical solution of this application or, in other words, a part thereof that contributes to existing technology, or other parts of the technical solution can be embodied in the form of a software product. The computer software product is stored in a storage medium, including several instructions used for causing a computer device (which may be a personal computer, a server, or a network device, and the like) to perform all or part of the steps of the method described in some embodiments of the application. The foregoing storage medium includes various medium that can store program codes, such as a U disk, a mobile hard disk, a ROM, a RAM, a magnetic disk, or an optical disk.

The above content is only a specific implementation of the embodiments of the application, without limiting the protection scope of the embodiments of the application. Any modification or replacement conceived by those skilled in the art within the technical scope disclosed in some embodiments of the application should be covered within the protection scope of the embodiments of the application. Therefore, the protection scope of the embodiments of the application shall be subject to the protection scope of the claims.

What is claimed is:

1. A signal transmission method, comprising:
   determining, by a first terminal, a first time point; and sending, by the first terminal, a first signal at the first time point, wherein the first signal is a positioning reference signal, wherein the signal transmission method further comprises:

acquiring, by the first terminal, configuration information of a resource pool; and determining, when the first time point selected by the first terminal within a first time range is not in the resource pool, a first available time point after the first time point and located within the resource pool as the first time point for sending the first signal.

2. The method according to claim 1, further comprising:
acquiring, by the first terminal, synchronization information at a second time point;

wherein the determining, by the first terminal, the first time point comprises: determining, by the first terminal, the first time point within the first time range after the second time point.

3. The method according to claim 1, further comprising:
acquiring, by the first terminal, first indication information; and determining the first time point according to the first indication information.

4. The method according to claim 3, wherein,
the first indication information is used for indicating time index information; and wherein the determining the first time point according to the first indication information comprises:

determining, by the first terminal, a time point corresponding to the time index information as the first time point.

5. The method according to claim 3, wherein,
the first indication information is used for indicating time offset information, the time offset information being indicative of a time offset between the first time point and a second time point; and wherein the determining the first time point according to the first indication information comprises:

determining, by the first terminal, the first time point based on the time offset information and the second time point.

6. The method according to claim 3, wherein the acquiring, by the first terminal, the first indication information comprises:

acquiring, by the first terminal, the first indication information according to pre-configured information; or acquiring, by the first terminal, the first indication information according to network configuration information; or receiving, by the first terminal, the first indication information sent by a second terminal.

7. The method according to claim 2, wherein the determining, by the first terminal, the first time point within the first time range after the second time point comprises:

selecting randomly, by the first terminal, a time point within the first time range as the first time point; or selecting, by the first terminal according to first identity information, a time point within the first time range as the first time point.

8. The method according to claim 1, wherein the determining, by the first terminal, the first time point comprises:

determining the first time point according to the configuration information of the resource pool, wherein the first time point is a transmission time point in the resource pool.

9. The method according to claim 1, wherein the determining, by the first terminal, the first time point comprises:

acquiring, by the first terminal, second indication information, the second indication information being used for determining a time domain position of a first reserved time point; and determining, by the first terminal, the first reserved time point as the first time point for sending the first signal;

wherein the first reserved time point refers to a time point not used for transmitting sidelink data.

10. The method according to claim 2, further comprising:
acquiring, by the first terminal, first information; and
determining the first time range according to the first information.

11. The method according to claim 10, wherein the first information comprises at least one of: positioning accuracy information, timing error information, frequency deviation information, quality of service QoS information, or QoS class identifier QCI information.

12. A terminal, comprising a processor, a memory and a transceiver, wherein the memory is configured to store a computer program; the processor, through calling and running the computer program stored in the memory, is configured to:

determine a first time point; and send, via the transceiver, a first signal at the first time point, wherein the first signal is positioning reference signal, wherein the processor is further configured to:

acquire configuration information of a resource pool; and
determine, when the first time point selected within a first time range is not in the resource pool, a first available time point after the first time point and located within the resource pool as the first time point for sending the first signal.

13. The terminal according to claim 12, the processor is further configured to:

acquire synchronization information at a second time point; and determine the first time point within the first time range after the second time point.

14. The terminal according to claim 12, the processor is further configured to:

acquire first indication information; and
determine the first time point according to the first indication information.

15. The terminal according to claim 14, wherein the first indication information is used for indicating time index information; and the processor is further configured to determine a time point corresponding to the time index information as the first time point.

16. The terminal according to claim 14, wherein, the first indication information is used for indicating time offset information, the time offset information being indicative of a time offset between the first time point and a second time point; and the processor is further configured to determine the first time point based on the time offset information and the second time point.

17. The terminal according to claim 14, wherein the processor is further configured to:

acquire the first indication information according to pre-configured information; or acquire the first indication information according to network configuration information; or receive, via the transceiver, the first indication information sent by a second terminal.

18. The terminal according to claim 13, wherein the processor is further configured to:
randomly select a time point within the first time range as the first time point; or
select, according to first identity information, a time point within the first time range as the first time point.

19. A non-transitory computer-readable storage medium, used for storing a computer program, wherein the computer program causes a computer to implement a signal transmission method comprising:
determining a first time point; and
sending first signal at the first time point, wherein the first signal is positioning reference signal,
wherein the signal transmission method further comprises:
acquiring, by the first terminal, configuration information of a resource pool; and
determining, when the first time point selected by the first terminal within a first time range is not in the resource pool, a first available time point after the first time point and located within the resource pool as the first time point for sending the first signal.

* * * * *